Figure 1:
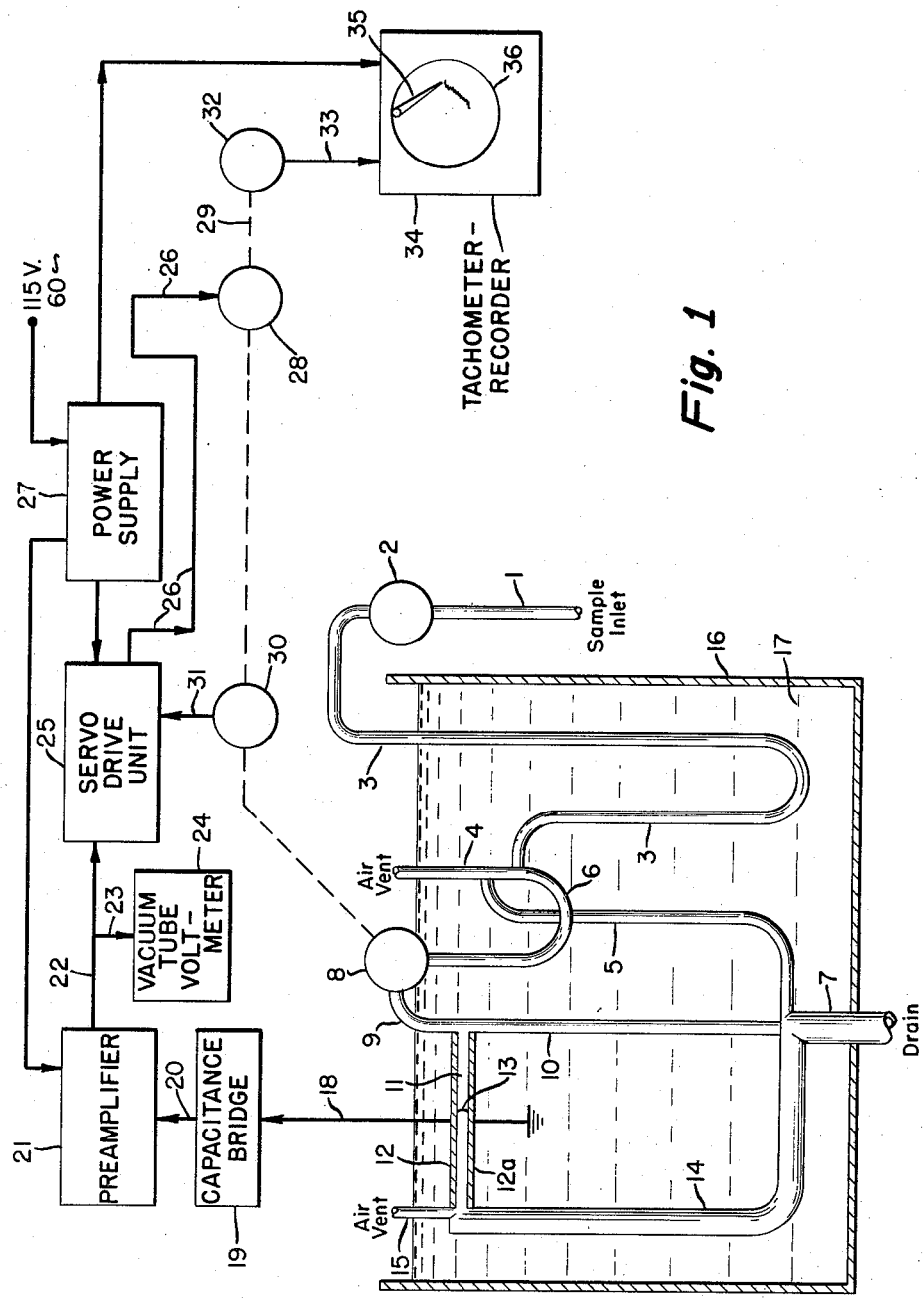

June 16, 1964

L. G. LEWIS ETAL 3,137,161

KINEMATIC VISCOSIMETER

Filed Oct. 1, 1959

2 Sheets-Sheet 1

INVENTORS:
Lowell Glenn Whitesell
Lloyd G. Lewis

BY

*Gerald Rose*

ATTORNEY

INVENTORS:
Lowell Glenn Whitesell
Lloyd G. Lewis
BY
Gerald Rose
ATTORNEY

United States Patent Office 3,137,161
Patented June 16, 1964

3,137,161
KINEMATIC VISCOSIMETER
Lloyd G. Lewis, La Grange, Ill., and Lowell Glenn Whitesell, Hammond, Ind., assignors to Standard Oil Company, Chicago, Ill., a corporation of Indiana
Filed Oct. 1, 1959, Ser. No. 843,772
6 Claims. (Cl. 73—55)

This invention relates to testing apparatus and more particularly pertains to a system for measuring the kinematic viscosity of liquids, whether as laboratory samples or as a continuously sampled flowing stream.

In many petroleum refinery and petrochemical operations there are instances in which it is necessary to determine viscosity as a control on product quality. In some instances, viscosity is best expressed in absolute units of poise. However, in specifying the viscosity ranges of lubricating oils, and in determining lubricating oil viscosity index, it is essential that kinematic viscosity in stokes be obtained. Kinematic viscosity is mathematically expressed as viscosity in absolute units divided by the mass density of the fluid. While many excellent laboratory and plant devices have been developed for determining absolute viscosity, the problem of obtaining the kinematic viscosity in an error-free system has remained a troublesome one.

When lubricating oils are to be blended to a viscosity specification, the need for rapid and accurate viscosity determinations becomes even more critical. In a typical blending operation, perhaps six or seven stocks of widely varying physical properties must be blended to obtain the final on-specification product. Blending times in modern refineries are quite short; half a tank car of motor oil is usually blended in about 15 minutes. A single run of a multi-stock blending machine seldom exceeds 30 minutes running time, and the majority of runs are 20 minutes or less. Keeping in mind that most viscosimeters heretofore available read in absolute viscosity units, yet the product must be blended to a kinematic viscosity specification, it is apparent that the laboratory determinations of absolute viscosity and density, coupled by appropriate computation to convert to kinematic units, would in many instances be longer than the total run of each blend. Obviously, it would be impossible for a laboratory to maintain continuous control of a blending operation which can be completed in the time required to check one viscosity and one density in the laboratory.

Accordingly, a primary object of this invention is to provide an instrument for the rapid and accurate measurement of kinematic viscosity of a liquid over wide viscosity ranges.

Briefly, according to the invention, the inventive viscosimeter comprises a flow restrictive conduit through which the sample fluid flows by gravity, under hydrostatic head, at a rate which is inversely proportional to its kinematic viscosity and directly proportional to the hydrostatic head of liquid in the conduit. Sample liquid is continuously transferred into the conduit by means of a variable rate pump, and the rate is varied so as to maintain a constant hydrostatic head, irrespective of flowrate through the conduit. The rate at which sample is transferred to the flow restrictive conduit is thus equal to the rate at which liquid flows through the conduit, and hence is inversely proportional to the kinematic viscosity of the sample liquid. This former rate is continuously monitored. Thus, by determining the rate necessary to maintain a constant hydrostatic head in the flow restrictive conduit, a measure of the kinematic viscosity of the sample liquid is obtained. In a special embodiment of the invention, this rate is determined by an apparatus which provides an indication that is linear with the kinematic viscosity.

Figure 2:
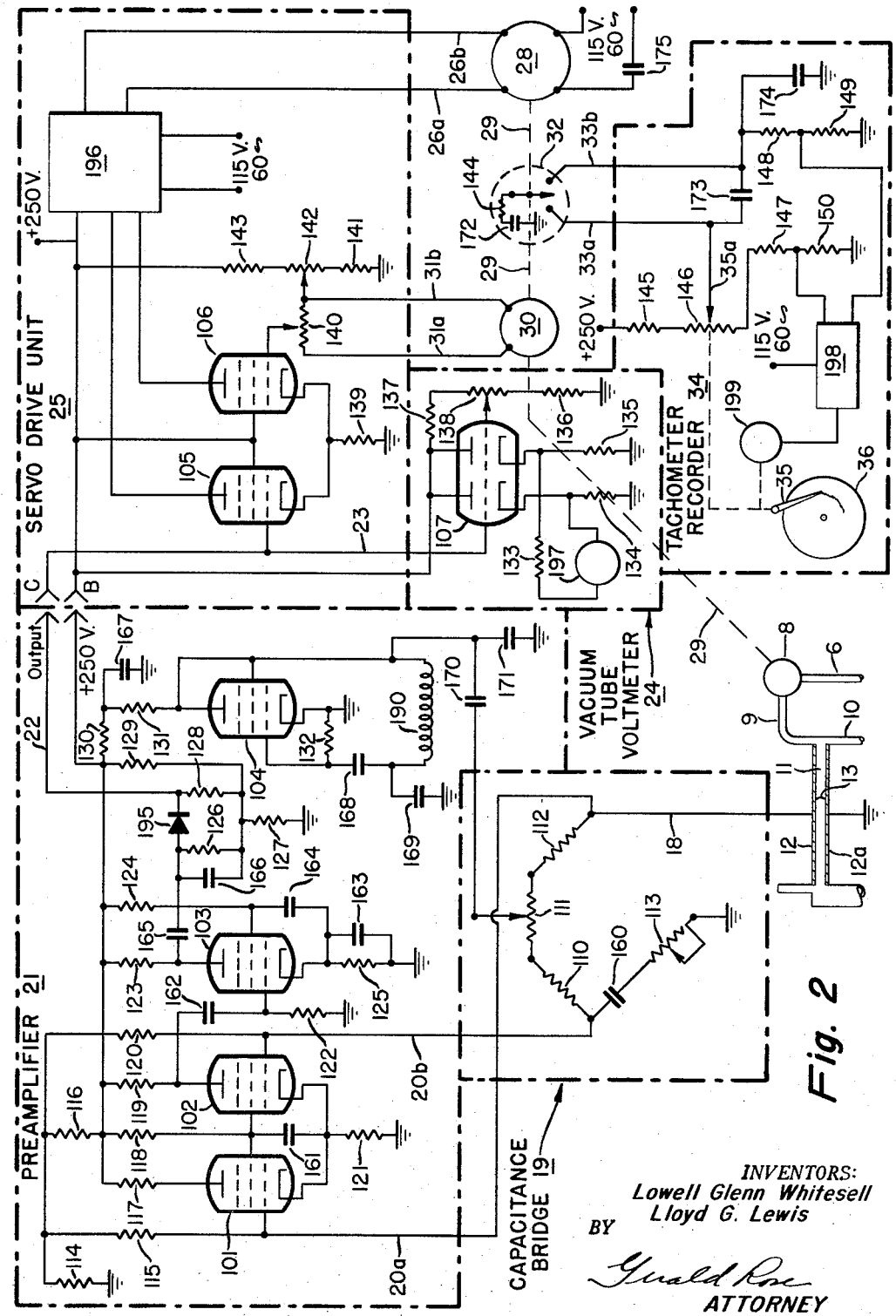

Further details of the invention will be apparent to those skilled in the art as the description herein proceeds with reference to the accompanying drawings wherein:

FIGURE 1 shows a schematic embodiment of the preferred form of the invention; and FIGURE 2 portrays in detail an electrical circuit suitable for application in accordance with the invention. The arrangement and numbering employed throughout FIGURE 2 parallel those shown in FIGURE 1.

Turning first to FIGURE 1, the inventive system essentially comprises a flow restrictive conduit such as capillary tube 10, a means for determining the hydrostatic head of liquid in tube 10 such as manometer 11, a variable speed pump 8 which is driven by servo motor 28, and appropriate electrical circuitry for varying the speed of pump 8 and motor 28 so as to maintain a constant hydrostatic head as indicated by manometer 11. Sample pumping rate may be determined by a shaft driven switch 32 coupled to servo motor 28, which connects with the tachometer-recorder 34.

Sample liquid such as lubricating oil or other material for which the viscosity is to be measured is introduced via sample inlet line 1, which connects either to a flowing stream of liquid or to a sample vessel. An excess of sample is pumped via feed pump 2; this pump rate is in excess of that required to send the flow through flow restrictive conduit or tube 10.

Sample liquid is pumped from feed pump 2 into a thermostatically controlled constant temperature bath 16. This bath 16 is filled with temperature-conducting liquid 17 such as a mineral or silicone heating oil which is stable at operating temperatures. Appropriate heating and/or cooling coils (not shown) are provided in bath 16, as is one or more thermostatic switches for the purpose of maintaining both tube 10 and the sample liquid at constant test temperature. While the precision of viscosity measurement is largely affected by the accuracy at which the temperature is regulated, for most purposes a bath 16 temperature which is controlled to within plus or minus 0.1° F. is adequate.

Sample liquid from feed pump 2 is pumped in heat exchange relationship with liquid 17 and bath 16 via heat exchanger coils 3 which are immersed in liquid 17. These coils 3 are of sufficient length and surface area as to assure the maintenance of substantially constant temperature of the sample liquid.

From coil 3, the sample flows to a vented overflow system where entrained air or other gases is vented to the atmosphere and from which a gas-free sample is taken for ultimate transfer to tube 10. This particular system includes a vented conduit 4 which releases to atmosphere, a bottom drawoff conduit 6 which leads to the variable speed servo pump 8, and an overflow conduit 5 which is disposed above conduit 6 and which releases excess sample liquid, over and above that necessary for transferring to tube 10, to drain 7. From drain 7, the liquid may either be returned to the main stream of liquid, or may be sent to a suitable sump.

That portion of sample liquid which is to be pumped to tube 10 is withdrawn via conduit 6 and taken to the suction of servo pump 8, which discharges through line 9 into tube 10. Line 9 remains full of liquid at all times. Servo pump 8 is a precision positive-displacement pump, suitably of the gear type, which meters an exact quantity of liquid dependent solely on pump speed and independent of liquid viscosity. Servo pump 8 is powered by servo motor 28 via shaft 29 or other equavalent coupling means. Shaft 29 may also be connected to a direct current (D.C.) tachometer 30 which is connected in a servo motor 28 feedback control system, and to the shaft driven switch 32 which connects via line 33 to the tachometer-recorder 34. Tachometer-recorder 34 provides the indication which is a measure of the kinematic viscosity of the sample liquid.

It is exceedingly important in the inventive system that the hydrostatic head of liquid in flow restrictive conduit or tube 10 be maintained at a substantially constant value. Many differential pressure devices which are suitable for this purpose are known. However, it has been found that exceptional precision and accuracy may be obtained by means of a vented horizontal manometer 11 system including parallel plate condensers 12 and 12a. This vented manometer system connects via conduit 14 to both the top and bottom portion of tube 10 and is vented to the atmosphere via vent 15. At the top of this system extends a substantially horizontal manometer tube 11, in which is present a meniscus 13 which assumes a position dependent on the integral of the differential pressure across tube 10. This integral feature establishes a reset action in the servo pump 8 speed control system for improved accuracy.

The position of meniscus 13 is located by means of parallel plate condenser made up of plates 12 and 12a, which is connected via line 18 into a capacitance bridge circuit 19. If the fluid whose viscosity is being measured has a dielectric constant which is substantially different from that of air, the effective capacitance of the parallel plate condenser will vary depending on what proportion of the volume between plates 12 and 12a is occupied by liquid. Thus, by suitable measurement of this capacitance by means of capacitance bridge circuit 19 the position of meniscus 13 in manometer 11 may be accurately indicated electrically.

Sample liquid which is transferred into tube 10 by means of servo pump 8 and conduit 9 flows through the tube at a rate which is inversely proportional to the kinematic viscosity of the sample fluid. The derivation of this proportionality relationship is as follows:

The Hagen-Poiseuille for flow through a vertical capillary tube is as follows:

$$\Delta P = 8n \frac{l\left(\frac{V}{t}\right)}{\pi r 4} \quad (1)$$

where $\Delta \rho$ is the total pressure drop across the capillary
$n$ is the viscosity in absolute units
$l$ is the length of the capillary
$(V/t)$ is the volume rate of flow of the liquid
$r$ is the radius of the capillary.

The kinematic viscosity is defined as $$\nu \equiv \frac{n}{\rho} \quad (2)$$

where $\nu$ is the kinematic viscosity
$\rho$ is the mass density of the fluid.

From an inspection of Equation 1, it may be seen that kinematic viscosity may be measured of $\Delta \rho$ is made to depend only on the density of the liquid. This is accomplished in the inventive system by using the action of gravity on the hydrostatic head of fluid. In this case, the internal $\Delta \rho$ is given by the expression:

$$\Delta \rho = \rho g h \quad (3)$$

where $g$ is the gravitational constant
and
$h$ is the liquid head, held constant by the servo pump.

Substituting Equation 3 in Equation 1, recalling that $h=l$, and solving for the kinematic viscosity, one obtains:

$$\frac{n}{\rho} \equiv \nu = \left[\frac{\pi r 4 g}{8 l}\right] h\left(\frac{t}{V}\right) \quad (4)$$

The first bracketed expression in the right-hand portion of Equation 4 is a number which is constant for a given capillary tube 10, and may be abbreviated by K. Writing Equation 4, and recalling that $V/t$ is the volume rate of flow of the liquid, one obtains:

$$\left(\frac{V}{t}\right) = \frac{K}{\nu} \quad (5)$$

Since $V/t$ and the speed of servo motor 28 (or pump 8) are proportional, the speed of servo motor 28 ($s$) may be substituted into Equation 5 to give the following:

$$s = \frac{K'}{\nu} K' = K \cdot \text{constant} \quad (6)$$

The signal from condenser 12 and 12a is sensed by capacitance bridge 19 which is energized by a radio frequency voltage supplied from an electronic oscillator circuit which is a part of preamplifier circuit 21. Both capacitance and dissipation factor balance adjustments may be included in capacitance bridge circuit 19, which bridge circuit is normally balanced for the condition of a half-filled manometer 11.

The unbalanced signal from capacitance bridge circuit 19 is electronically amplified in preamplifier 21 and is converted from a radio frequency signal to direct current by a suitable rectifier such as a crystal diode.

The D.C. signal from preamplifier 21 is then fed via line 22 to servo drive unit 25. This unit may be any of a variety of circuits adapted for regulating the speed or velocity of a servo motor. Numerous suitable circuits are described for example in the book "Basic Electricity," NAVPERS 10086, prepared by the Bureau of Naval Personnel, 1956, Chapter 17. Magnetic amplifiers, saturable reactors, or vacuum tube servo drive units may be employed, although it has been found that extreme ruggedness and simplicity are achieved with the use of a magnetic amplifier in this service.

A valuable adjunct to the present circuit comprises voltmeter 24 of the vacuum tube type, connected via line 23 into the electrical circuit. Vacuum tube voltmeter 24 provides a dial reading which is linear with the position of meniscus 13 in manometer 11. This is useful in adjusting the instrument for proper operation and detecting malfunction.

Servo drive unit 25 is connected into servo motor 28 via line 26. Whenever the position of meniscus 13 moves as to indicate a reduced effective hydrostatic head in tube 10, the circuit of capacitance bridge 19, preamplifier 21, and servo drive unit 25 increases the speed of servo motor 28 to pump more liquid through servo pump 8 and thereby restore zero $\Delta \rho$ across tube 10. Conversely, a meniscus position in manometer 11 which is higher than normal operates to reduce the speed of servo motor 28 and correspondingly reduce the pumping rate of sample liquid into tube 10.

The various circuit components receive power from a conventional power supply unit 27; this preferably is equipped with voltage regulator tubes so as to provide a regulated constant voltage supply for the various components.

A shaft driven switch 32 is coupled mechanically to servo motor 28 to indicate the speed of motor 28 and hence pumping rate of liquid into tube 10. Driven switch 32 connects via line 33 into a tachometer-recorder 34 of improved design which will be described in more detail hereinafter. The speed may be recorded via pen 35 on rotating chart 36.

The above-described system, without D.C. tachometer 30, is workable over limited speed ranges. It has been found, however, that the inclusion of a velocity feedback circuit insures precise maintenance of meniscus 13 in manometer 11 and is of exceptional advantage for providing a stable servo system. Furthermore, it permits the use of a magnetic amplifier in servo drive unit 25, which has non-linear amplification characteristics.

Turning now to FIGURE 2, at the lower left-hand portion of the drawing is a portion of the viscosimeter assembly described in detail in FIGURE 1. The balance of FIGURE 2 depicts in detail the preferred electronic circuit which may be embodied in the inventive system.

Capacitance bridge circuit 19, which includes as an element thereof the parallel plate condenser 12 and 12a, receives radio frequency voltage through condenser 170 from an electronic oscillator circuit of preamplifier 21. The capacitance and dissipation factor balance adjustments of capacitance bridge 19 are regulated by appropriate adjustment of variable resistors 111 and 113, respectively. When employing a servo motor system, only a small motion of meniscus 13 is required to cause the servo motor to operate from zero to full rated speed.

Preamplifier 21 is a multistage electronic device including pentodes 101, 102 and 103. The plate output of tube 103 is converted from a radio frequency signal to D.C. by a circuit including crystal diode rectifier 195. Pentode tube 104 is connected as the oscillator which provides RF voltage to capacitance bridge 19.

The output from preamplifier 21 is sent through line 22 to servo drive unit 25. This unit preferably comprises a magnetic amplifier 196 of conventional type. Magnetic amplifiers are described, for example, in "Electronics Technician 1 & 3," NAVPERS 10192, Bureau of Naval Personnel, 1958, chapter 9. A suitable magnetic amplifier is available from Magnetic Amplifiers, Inc., which is identified as model MA-61401. Magnetic amplifier 196 is driven by vacuum tubes 105 and 106; the input to tube 105 is derived from preamplifier 21. Tube 106 provides another part of the drive signal to magnetic amplifier 196 and takes its input from a D.C. tachometer 30 through lines 31a and 31b and from potentiometer 142. Potentiometer 142 is set to provide the desired meniscus position. Tachometer 30 is connected to servo motor 28 drive shaft 29 and provides, via tube 106, a negative feedback path which acts to linearize the magnetic amplifier-servo motor characteristic and fixes the control system major loop gain. With this feedback system, the overall viscosimeter has outstanding stability and accuracy.

A vacuum tube voltmeter circuit 24 is connected in circuit via line 23 with the output 22 of preamplifier 21. The reading on the dial of microammeter 197 shows the position of meniscus 13 in manometer 11.

To provide a means for determining the speed of rotation of servo motor 28, or its equivalent (servo pump 8), a second tachometer arrangement driven by switch 32 is coupled to shaft 29. The preferred second tachometer consists of a set of four sequentially operating double throw contacts which are mechanically driven from servo motor shaft 29. These contacts alternately charge capacitors from a servo-adjustable voltage source and discharge them into a filter circuit. A portion of the voltage from this filter circuit is continuously compared with a reference voltage obtained from the same supply as the adjustable charging supply. Any difference in the voltage acts through a servo amplifier 198 to drive a servo motor 199 connected to move the pen arm 35 and arm 35a of an adjustment potentiometer supplying the switch capacitor. This provides more or less charge transfer per trip, as required to restore the voltage to the proper value. Arm 35a of adjustment potentiometer 146 is coupled to pen arm 35 of a tachometer recorder 34, which records a signal on chart 36 which is inversely proportional to pump 8 speed and, therefore, directly proportional to the kinematic viscosity of the fluid sample being measured.

The faster the speed of servo motor 199, the more are the charge transfers which occur per unit time. The more charge transfers which occur per unit time, the less is the charge voltage required to transfer the same fixed amount of charge and maintain the necessary filter voltage. Consequently, the charge voltage, and thus the charge voltage potentiometer arm position, are then an inverse function of the servo motor speed.

Although not shown in the drawing, pen arm 35 of tachometer recorder 34 may be connected into a control system for the purpose of regulating a process variable which determines the viscosity of the sample being measured. Many such devices are known, and operate on the principle of adjusting a process variable to restore a dependent variable such as kinematic viscosity to a value approaching that of a desired variable, e.g., the set point corresponding to a desired product viscosity.

In another modification, two viscosimeters can be employed which have outputs that are fed into an analog computer. For example, if one viscosimeter is at 100° F. and the other at 210° F., the computer can be set to give a direct reading of the viscosity index of the sample.

It has been found that certain features are susceptible to random errors unless carefully controlled. For example, the temperature and thermostatically controlled boiling bath 16 should not be permitted to vary more than about 0.1° F. If possible, all portions of the viscosimeter, including servo pump 8, should be immersed in liquid 17 of oil bath 16. Servo pump 8 should be as accurate a pump as is available, and should be maintained in good condition. Tube 10 should be a precision bore capillary having a length which is at least several times greater than that of the bore, e.g., 0.05" I.D. and 5" long; there should be no abrupt changes in tube diameter near manometer 11. Tube 10 should be kept clean, preferably by the installation of suitable filters after feed pump 2. The charge transferring contacts in the tachometer 34 should be rugged and durable; they must be capable of operating at the extreme ranges of servo motor 28 speed with equal precision, and should have a useful life of millions of cycles.

The foregoing specific values of electronic components have been found exceptionally suitable for use in accordance with the inventive circuit:

Tubes:
```
    101_____ 6AK5
    102_____ 6AK5
    103_____ 6AK5
    104_____ 6AK5
    105_____ 6AU6
    106_____ 6AU6
    107_____ 12AU7
```

Inductances:
```
    190 _____mh__ 2.5
```

Resistors:
```
    110 _____ohms__ 15K
    111 _____(pot.)__ 5K
    112 _____ 15K
    113 _____(pot.)__ 5K
    114 _____ 22K
    115 _____meg__ 1
    116 _____ 90K
    117 _____ 47K
    118 _____ 69K
    119 _____ 47K
    120 _____meg__ 1
    121 _____ 11K
    122 _____meg__ 1
    123 _____ 16K
    124 _____ 82K
    125 _____ 270
    126 _____ 100K
    127 _____ 56K
    128 _____meg__ 1
    129 _____ 34K
    130 _____ 50K
    131 _____ 34K
    132 _____ 47K
    133 _____ 200K
    134 _____ 10K
    135 _____ 10K
    136 _____(pot.)__ 33K
```

Resistors:

| | | |
|---|---|---|
| 137 | | 220K |
| 138 | (pot.) | 20K |
| 139 | | 12K |
| 140 | meg. (pot.) | 1 |
| 141 | | 47K |
| 142 | (pot.) | 250K |
| 143 | | 180K |
| 144 | | 100K |
| 145 | | 15K |
| 146 | (pot.) | 10K |
| 147 | | 250 |
| 148 | meg | 1 |
| 149 | | 1K |
| 150 | | 0.25 |

Capacitors:

| | | |
|---|---|---|
| 160 | mmf | 20 |
| 161 | mf | 0.01 |
| 162 | mf | 0.01 |
| 163 | mf | 0.01 |
| 164 | mf | 0.01 |
| 165 | mf | 0.01 |
| 166 | mmf | 100 |
| 167 | mf | 0.01 |
| 168 | mmf | 100 |
| 169 | mmf | 150 |
| 170 | mmf | 15 |
| 171 | mmf | 50 |
| 172 | mf | 0.002 |
| 173 | mf | 0.25 |
| 174 | mf | 4.0 |
| 175 | mf | 3.0 |

From the foregoing description, it is seen that an exceptionally useful instrument has been provided for rapidly determing the kinematic viscosity of a liquid. The system is relatively simple and rugged, yet accurate, dependable, and rapid in its action.

While the invention has been described in relation to specific embodiments thereof and set forth in considerable detail, it should be understood that these are by way of illustration only, and that our invention is not limited thereto. Alternative and equivalent embodiments will become apparent to those skilled in the art in view of our description of the invention. Accordingly, modifications in our invention are contemplated without departing from the spirit and broad scope thereof.

We claim:

1. Apparatus for determining the kinematic viscosity of a sample liquid which comprises a flow restrictive conduit through which sample liquid flows at a rate inversely proportional to its kinematic viscosity, a manometer connected to said flow restrictive conduit and having a meniscus-detecting parallel plate condenser for determining the head of liquid in said conduit, said parallel plate condenser being included in a capacitance bridge, an amplifier for amplifying the output of said capacitance bridge, a variable speed pump for supplying liquid to said flow restrictive conduit at a rate effective to maintain a constant liquid head in said flow restrictive conduit, a servo motor driving said variable pump and responsive to the output of the amplifier, and a tachometer for determining the speed of said servo motor as a measure of the kinematic viscosity of the sample liquid.

2. Apparatus of claim 1 wherein the flow restrictive conduit, the parallel plate condenser, and the variable speed pump are all immersed in a thermostatically controlled bath.

3. Apparatus of claim 1 including a feedback loop from a second tachometer coupled to said servo motor and connected into a drive circuit for said servo motor.

4. Apparatus for determining kinematic viscosity of a sample liquid which comprises a flow-restrictive conduit, head-determining means adapted for determining the hydrostatic head of sample liquid supplied to said conduit, said head-determining means being connected to said conduit and including a horizontal manometer, said manometer being provided with a meniscus-directing means having a variable capacitance, regulating means adapted for varying the rate of supply of sample liquid to maintain a constant head of sample liquid to said conduit, said regulating means being responsive to said head-determining means, and rate-determining means responsive to said regulating means, said rate-determining means adapted for determining the rate at which the sample liquid is supplied to said conduit as a measure of the kinematic viscosity of said sample liquid.

5. Apparatus for continuously determining the kinematic viscosity of a sample liquid which comprises a flow-restrictive conduit through which sample liquid flows at a rate inversely proportional to its kinematic viscosity, sample-supplying means for continuously supplying sample liquid to said conduit at a variable rate, head-determining means adapted for determining the hydrostatic head of sample liquid in said conduit, said head-determining means including a horizontal manometer with a meniscus-detecting parallel plate condenser therein, regulating means responsive to said head-determining means, said regulating means adapted for varying said sample-supplying means while maintaining a constant head of liquid in said conduit, the rate-determining means adapted for determining the rate at which sample liquid is supplied to said conduit as a measure of the kinematic viscosity of said sample liquid.

6. An improved apparatus for use in determining kinematic viscosity which comprises a vertical capillary tube through which sample liquid flows by gravity, a vented horizontal manometer connected to the top and the bottom of said capillary tube, said horizontal manometer including a meniscus-detecting parallel plate condenser for determining the effective head of liquid in said capillary tube, first pump means for supplying a sample liquid to said capillary tube, regulating means responsive to said parallel plate condenser for controlling the output rate of said first pump means to maintain a constant hydrostatic head in said capillary tube, vented conduit for supplying sample liquid to said first pump means at a rate in excess of the output of said first pump means, overflow conduit for discarding said excess, and second pump means for supplying sample liquid to said first pump means.

References Cited in the file of this patent

UNITED STATES PATENTS

| | | |
|---|---|---|
| 2,065,695 | Haultain | Dec. 29, 1936 |
| 2,097,388 | Cole | Oct. 26, 1937 |
| 2,194,527 | Ray | Mar. 26, 1940 |
| 2,322,814 | Binckley | June 29, 1943 |
| 2,700,891 | Shafer | Feb. 1, 1955 |
| 2,724,088 | Smith | Nov. 15, 1955 |
| 2,766,429 | Hollmann | Oct. 9, 1956 |
| 2,771,770 | Bouman | Nov. 27, 1956 |